US012304364B2

(12) United States Patent
Lee et al.

(10) Patent No.: US 12,304,364 B2
(45) Date of Patent: May 20, 2025

(54) SEAT ADJUSTMENT APPARATUS FOR MOBILITY

(71) Applicants: Hyundai Motor Company, Seoul (KR); Kia Corporation, Seoul (KR); Daechang Seat Co., LTD-Dongtan, Gyeonggi-do (KR); Hyundai Transys Inc., Chungcheongnam-do (KR)

(72) Inventors: Sang Soo Lee, Gyeonggi-do (KR); Chan Ho Jung, Gyeonggi-do (KR); Mu Young Kim, Gyeonggi-do (KR); Sang Hark Lee, Incheon (KR); Ho Suk Jung, Gyeonggi-do (KR); Deok Soo Lim, Gyeonggi-do (KR); Sang Do Park, Gyeonggi-do (KR); Jae Yong Jang, Gyeonggi-do (KR); Hyun Tak Ko, Gyeonggi-do (KR); Ho Sung Kang, Gyeonggi-do (KR); Hae Dong Kwak, Gyeonggi-do (KR); In Sun Baek, Gyeonggi-do (KR); Sin Chan Yang, Gyeonggi-do (KR); Jun Sik Hwang, Gyeonggi-do (KR); Chan Ki Cho, Gwanju (KR); Myung Soo Lee, Gyeonggi-do (KR)

(73) Assignees: Hyundai Motor Company, Seoul (KR); Kia Corporation, Seoul (KR); Daechang Seat Co., LTD-Dongtan, Gyeonggi-do (KR); Hyundai Transys Inc., Chungcheongnam-do (KR)

( * ) Notice: Subject to any disclaimer, the term of this patent is extended or adjusted under 35 U.S.C. 154(b) by 222 days.

(21) Appl. No.: 18/100,830

(22) Filed: Jan. 24, 2023

(65) Prior Publication Data
US 2024/0034200 A1    Feb. 1, 2024

(30) Foreign Application Priority Data
Jul. 28, 2022    (KR) ........................ 10-2022-0094091

(51) Int. Cl.
    *B60N 2/12*      (2006.01)
    *B60N 2/02*      (2006.01)
    *B60N 2/18*      (2006.01)

(52) U.S. Cl.
    CPC ........... *B60N 2/12* (2013.01); *B60N 2/02246* (2023.08); *B60N 2/1821* (2013.01);
 (Continued)

(58) Field of Classification Search
    CPC .... B60N 2/12; B60N 2/02246; B60N 2/1821; B60N 2/1864; B60N 2/02253; B60N 2/00258; B60N 2002/0216; B61D 33/0078
 (Continued)

(56) References Cited

U.S. PATENT DOCUMENTS 6,347,778 B1 *   2/2002   Koga ................... B60N 2/1615
      297/344.13
6,851,753 B2 *   2/2005   Akaike ................ B60N 2/1685
      297/216.16
(Continued)

FOREIGN PATENT DOCUMENTS

JP       2009-202844 A     9/2009
WO     WO-2018021579 A1 *   2/2018 ............... A47C 7/02

*Primary Examiner* — Jose V Chen
(74) *Attorney, Agent, or Firm* — Fox Rothschild LLP

(57) ABSTRACT

Disclosed is a seat adjustment apparatus for a mobility vehicle, in which a seat cushion slides in a forward/rearward direction while moving upward or downward when the seat cushion is tilted, thereby allowing an occupant to take a stable posture. In one aspect, the seat apparatus comprises 1) a fixing bracket fixed to a floor surface; 2) a setting bracket disposed above the fixing bracket and connected to a back frame so that the back frame is rotatable; 3) a guide unit disposed at a front end of the fixing bracket and a front end of the setting bracket; 4) a guide part disposed at a rear end
(Continued)

of the fixing bracket and a rear end of the setting bracket; and
5) a drive unit connected to the guide unit.

20 Claims, 12 Drawing Sheets

(52) U.S. Cl.
CPC .... B60N 2/1864 (2013.01); *B60N 2002/0216* (2013.01); *B60N 2/02253* (2023.08); *B60N 2/02258* (2023.08)

(58) Field of Classification Search
USPC .......................................... 297/344.1, 344.17
See application file for complete search history.

(56) References Cited

U.S. PATENT DOCUMENTS

| | | | | |
|---|---|---|---|---|
| 6,921,058 B2* | 7/2005 | Becker | ................ | B60N 3/16 |
| | | | | 248/370 |
| 7,066,540 B2* | 6/2006 | Minai | ................ | B60N 2/165 |
| | | | | 297/344.17 |
| 7,278,686 B2* | 10/2007 | Yoshida | ................ | B60N 2/1615 |
| | | | | 248/421 |
| 8,113,588 B2* | 2/2012 | Beneker | ................ | B60N 2/164 |
| | | | | 297/344.17 |
| 8,177,280 B2* | 5/2012 | Yamada | ................ | B60N 2/62 |
| | | | | 296/65.05 |
| 8,590,971 B2* | 11/2013 | Ito | ................ | B60N 2/1615 |
| | | | | 297/344.13 |
| 8,851,570 B2* | 10/2014 | Fujihara | ................ | B60N 2/168 |
| | | | | 297/344.17 |
| 8,998,325 B2* | 4/2015 | Jonsson | ................ | B60N 2/42709 |
| | | | | 297/216.19 |
| 11,772,524 B2* | 10/2023 | Roche | ................ | B60N 2/06 |
| | | | | 297/344.1 |
| 2004/0201264 A1* | 10/2004 | Hofmann | ................ | B60N 2/005 |
| | | | | 297/344.1 |
| 2015/0307011 A1* | 10/2015 | Ushiyama | ................ | B61D 33/0035 |
| | | | | 297/344.1 |
| 2017/0028890 A1* | 2/2017 | Matsui | ................ | B60N 2/68 |
| 2020/0086770 A1* | 3/2020 | Huf | ................ | B60N 2/1615 |
| 2020/0391621 A1* | 12/2020 | Jung | ................ | B60N 2/045 |
| 2021/0078469 A1* | 3/2021 | Humer | ................ | B60N 2/02246 |
| 2022/0134912 A1* | 5/2022 | Hupp | ................ | B60N 2/1615 |
| | | | | 297/344.17 |
| 2023/0078759 A1* | 3/2023 | Maruo | ................ | B60N 2/02246 |
| | | | | 297/344.17 |
| 2023/0086757 A1* | 3/2023 | Toyoshima | ................ | B60N 2/0224 |
| | | | | 297/338 |
| 2023/0141294 A1* | 5/2023 | Zuo | ................ | B60N 2/02246 |
| | | | | 296/65.05 |
| 2023/0166643 A1* | 6/2023 | Zuo | ................ | B60N 2/1864 |
| | | | | 297/344.17 |
| 2023/0191974 A1* | 6/2023 | Kim | ................ | B60N 3/063 |
| | | | | 297/423.19 |
| 2024/0300385 A1* | 9/2024 | Kieser-Neumeyer | ................ | |
| | | | | B60N 2/0264 |

* cited by examiner

SEAT ADJUSTMENT APPARATUS FOR MOBILITY

CROSS REFERENCE TO RELATED APPLICATION

The present application claims under 35 U.S.C. § 119(a) the benefit of Korean Patent Application No. 10-2022-0094091, filed on Jul. 28, 2022, the entire contents of which is incorporated herein for all purposes by this reference.

BACKGROUND OF THE DISCLOSURE

Technical Field

The present disclosure relates to a seat adjustment apparatus for a mobility, in which a seat cushion slides in a forward/rearward direction while moving upward or downward when the seat cushion is tilted, thereby allowing an occupant to take a stable posture.

Background

In general, a mobility vehicle includes front seats in which a driver and an assistant are seated, and rear seats disposed rearward of the front seats and configured to allow an additional occupant to be seated in the rear seats. Various convenience devices are installed in the seat to improve the convenience for the occupants.

Examples of the convenience device mounted in the seat include: a seat position adjustment device configured to adjust a position of the seat by moving the seat in a forward/rearward direction in accordance with an occupant's body type; a reclining device configured to adjust a gradient of a seatback; a height device configured to adjust a height of the seat; and a tilting device configured to adjust a tilting angle of the seat.

With the recent development of autonomous vehicles, the adjustment of the position of the seat is more widely applied. However, because the tilting device in the related art tilts the entire seat, the occupant's lower body and buttocks are entirely moved. For this reason, the occupant's seating height is changed in a tilting mode of the seat, which causes an uncomfortable seating posture.

In particular, because the rear seat has a narrower space than the front seat, a range of the tilting function is limited. For this reason, it is restrictive to adjust the position of the seat, and it is possible to only change an angle of the seat cushion. As a result, there is a limitation in providing convenience that allows the occupant to take various postures.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed to solve these problems and aims to provide a seat adjustment apparatus for a mobility, in which a seat cushion slides in a forward/rearward direction while moving upward or downward when the seat cushion is tilted, thereby improving seating convenience by allowing an occupant to take a stable posture.

In one aspect, a seat adjustment apparatus for a mobility vehicle, the seat adjustment apparatus comprising: a) a fixing bracket configured to be fixed to a floor surface; b) a setting bracket disposed above the fixing bracket and connected to a back frame so that the back frame is rotatable; c) a guide unit disposed at a front end of the fixing bracket and a front end of the setting bracket and configured to allow the setting bracket to move relative to the fixing bracket; d) a guide part disposed at a rear end of the fixing bracket and a rear end of the setting bracket and configured to guide a movement of the setting bracket relative to the fixing bracket; and e) a drive unit connected to the guide unit and configured to operate in conjunction with the guide unit and rotate or rectilinearly move so that the setting bracket moves or slides to change a position thereof.

An exemplary embodiment of the present disclosure provides a seat adjustment apparatus for a mobility, the seat adjustment apparatus including: a fixing bracket fixed to a floor surface; a setting bracket disposed above the fixing bracket and connected to a back frame so that the back frame is rotatable; a guide unit disposed at a front end of the fixing bracket and a front end of the setting bracket and configured to allow the setting bracket to move relative to the fixing bracket while rotating or rectilinearly moving; a guide part disposed at a rear end of the fixing bracket and a rear end of the setting bracket and configured to guide a movement of the setting bracket relative to the fixing bracket; and a drive unit connected to the guide unit and configured to operate in conjunction with the guide unit and rotate or rectilinearly move so that the setting bracket moves or slides upward or downward to change a position thereof.

The drive unit may include a first drive unit and a second drive unit, the first drive unit may be installed on the fixing bracket, connected to the guide unit, and configured to allow the setting bracket to slide along the guide part, and the second drive unit may be installed on the setting bracket, connected to the guide unit, and configured to allow the setting bracket to move upward or downward by means of the guide unit.

The guide unit may include: a first link rotatably installed on the fixing bracket; and a second link rotatably connected to the setting bracket and the first link.

The first drive unit may be connected to the first link, and when the first drive unit operates, the first link may rotate in a forward/rearward direction relative to the fixing bracket, such that the setting bracket may move in the forward/rearward direction. The second drive unit may be connected to the second link, and when the second drive unit operates, the second link may be unfolded or folded with respect to the first link, such that the setting bracket may move upward or downward.

The first link may be provided as a pair of first links connected to each other by a first connection pipe, the first drive unit may be connected to the first connection pipe, the first link, together with the first connection pipe, may rotate relative to the fixing bracket in accordance with whether the first drive unit operates, such that the setting bracket may move in a forward/rearward direction along the guide part.

The first drive unit may include: a first motor; and a connection rod connected to the first connection pipe, and when the first motor operates, the connection rod may be extended or retracted, such that the first link rotates together with the first connection pipe.

A second link may be provided as a pair of second links connected to each other by a second connection pipe, the second drive unit may be connected to the second connection pipe, and the second link, together with the second connection pipe, may rotate relative to the first link in accordance with whether the second drive unit operates, such that the setting bracket may move upward or downward.

A driven gear part may be provided on the second connection pipe, the second drive unit may include: a second motor; and a driving gear part configured to engage with the driven gear part, and when the second motor operates, the driven gear part may rotate together with the driving gear part.

The driving gear part may rotate when the second motor of the second drive unit operates, and a connection gear may be formed on an outer periphery of the driven gear part and engage with the driving gear part.

A guide hole may be formed at an end of the driven gear part and extend in a rotation direction, a support part may be provided on the second drive unit and support a rotation of the driving gear part, and the support part may be inserted into the guide hole and guide a rotation of the driven gear part.

The guide part may include: a guide bracket fixed to the fixing bracket and having an extension hole extending in a forward/rearward direction; and a slider installed on the setting bracket, inserted into the extension hole, and configured to move along the extension hole.

The extension hole of the guide bracket may extend forward to be inclined downward.

The guide unit may include: a height bracket fixed to the fixing bracket and having a slit hole extending to be inclined in a forward/rearward direction; and a movable bracket installed on the setting bracket, extending downward, inserted into the slit hole, and configured to move along the slit hole.

The drive unit may include: a drive motor installed on the fixing bracket; and a driving rod extending from the drive motor, connected to the setting bracket, and configured to be retracted or extended when the drive motor operates.

The slit hole of the guide unit may extend forward to be inclined upward, and the driving rod of the drive unit may operate to be retracted or extended in a direction in which the slit hole is inclined.

The guide part may include: a guide bracket fixed to the fixing bracket and having an extension hole extending forward to be inclined downward; and a slider installed on the setting bracket, inserted into the extension hole, and configured to move along the extension hole.

According to the seat adjustment apparatus for a mobility having the above-mentioned structure, the seat cushion slides in the forward/rearward direction while moving upward or downward when the seat cushion is tilted, thereby improving seating convenience by allowing the occupant to take a stable posture.

In some embodiments, in a relaxation mode, the first and second drive units operate such that the back frame is fully tilted back.

In some embodiments, in a baggage loading mode, the first and second drive units operate such that the back frame is fully folded front.

In some embodiments, in a child mode, the first and second drive units operate such that a position of a seat cushion is lowered.

As discussed, the method and system suitably include use of a controller or processer.

In another embodiment, vehicles are provided that comprise an apparatus as disclosed herein. For instance, in one aspect, a vehicle is provided that comprises a seat adjustment apparatus for the vehicle, the seat adjustment apparatus comprising: a) a fixing bracket fixed to a floor surface of the vehicle; b) a setting bracket disposed above the fixing bracket and connected to a back frame so that the back frame is rotatable; c) a guide unit disposed at a front end of the fixing bracket and a front end of the setting bracket and configured to allow the setting bracket to move relative to the fixing bracket; d) a guide part disposed at a rear end of the fixing bracket and a rear end of the setting bracket and configured to guide a movement of the setting bracket relative to the fixing bracket; and e) a drive unit connected to the guide unit and configured to operate in conjunction with the guide unit and rotate or rectilinearly move so that the setting bracket moves or slides to change a position thereof.

DETAILED DESCRIPTION OF THE DISCLOSURE

Figure 1:
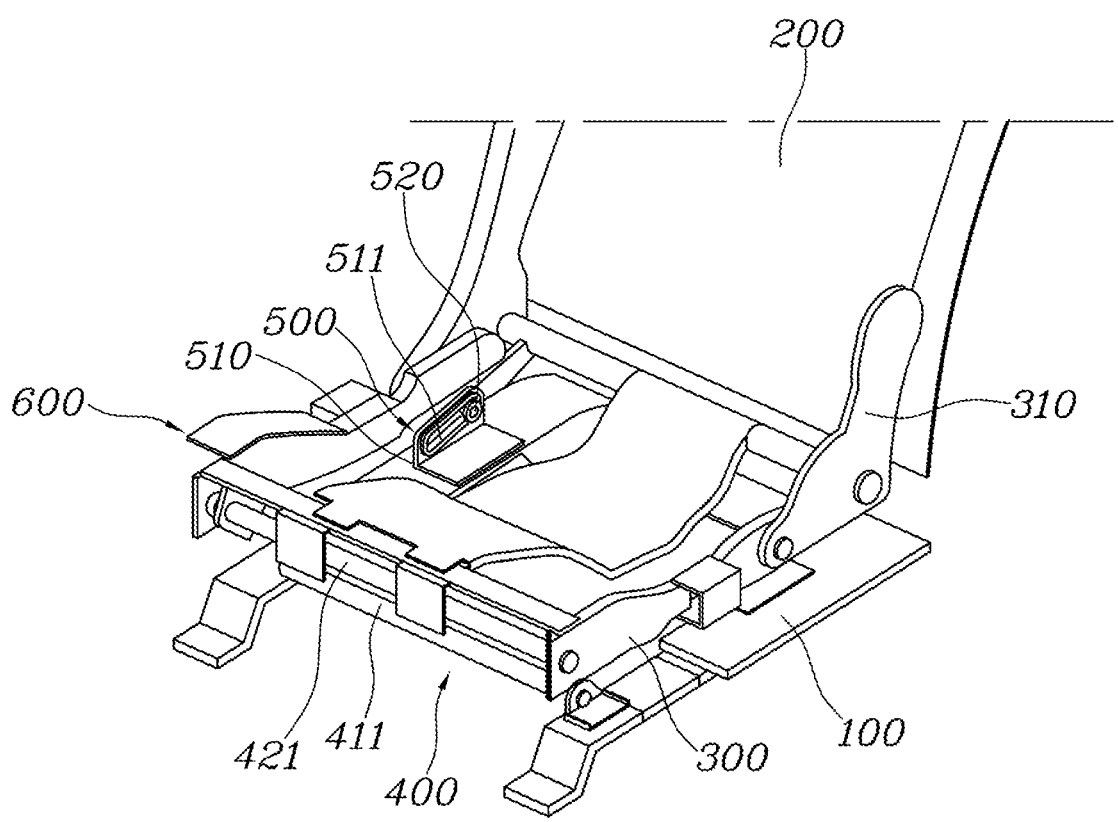
FIG. 1 is a view illustrating a seat adjustment apparatus for a mobility according to the embodiment of the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The suffixes 'module', 'unit', 'part', and 'portion' used to describe constituent elements in the following description are used together or interchangeably in order to facilitate the description, but the suffixes themselves do not have distinguishable meanings or functions.

In the description of the exemplary embodiments disclosed in the present specification, the specific descriptions of publicly known related technologies will be omitted when it is determined that the specific descriptions may obscure the subject matter of the exemplary embodiments disclosed in the present specification. In addition, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" including "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic command, and input/output information, and one or more processors configured to perform determination, computation, decision, or the like required to control the corresponding function.

Hereinafter, a seat adjustment apparatus for a mobility according to exemplary embodiments of the present disclosure will be described with reference to the accompanying drawings.

Figure 2:
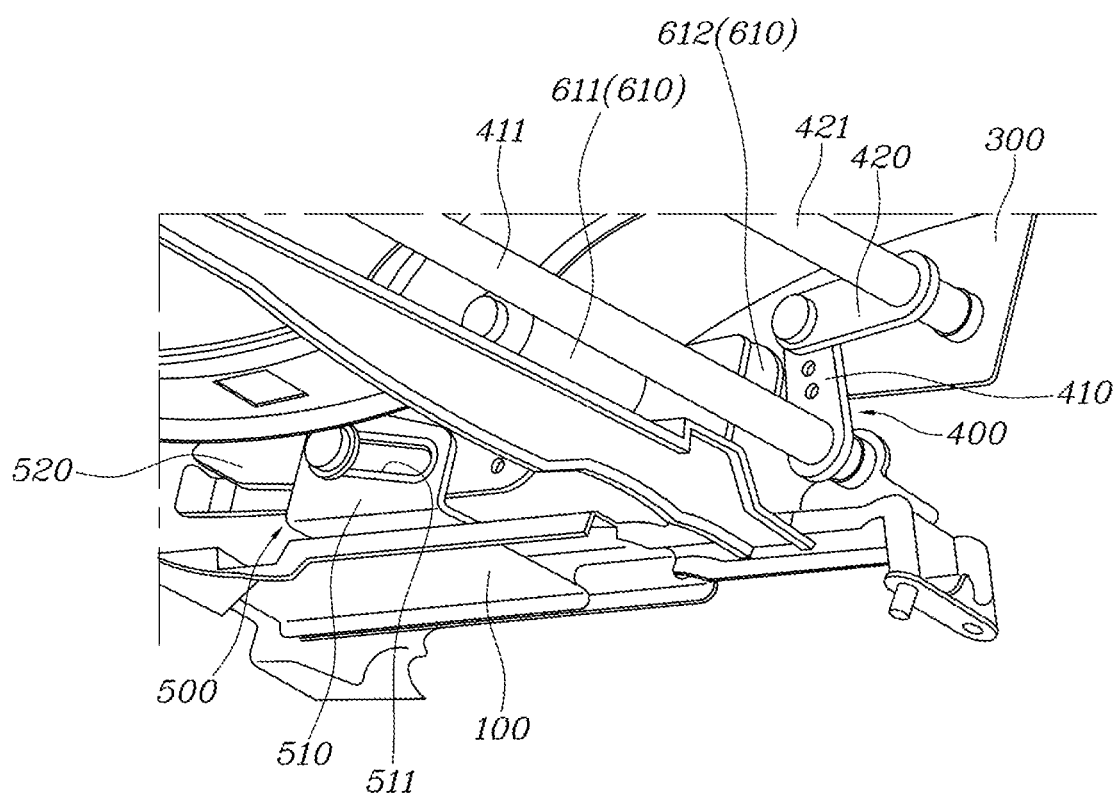
FIG. 2 is a view illustrating connection of a first drive unit of the seat adjustment apparatus for a mobility illustrated in FIG. 1.
Figure 3:
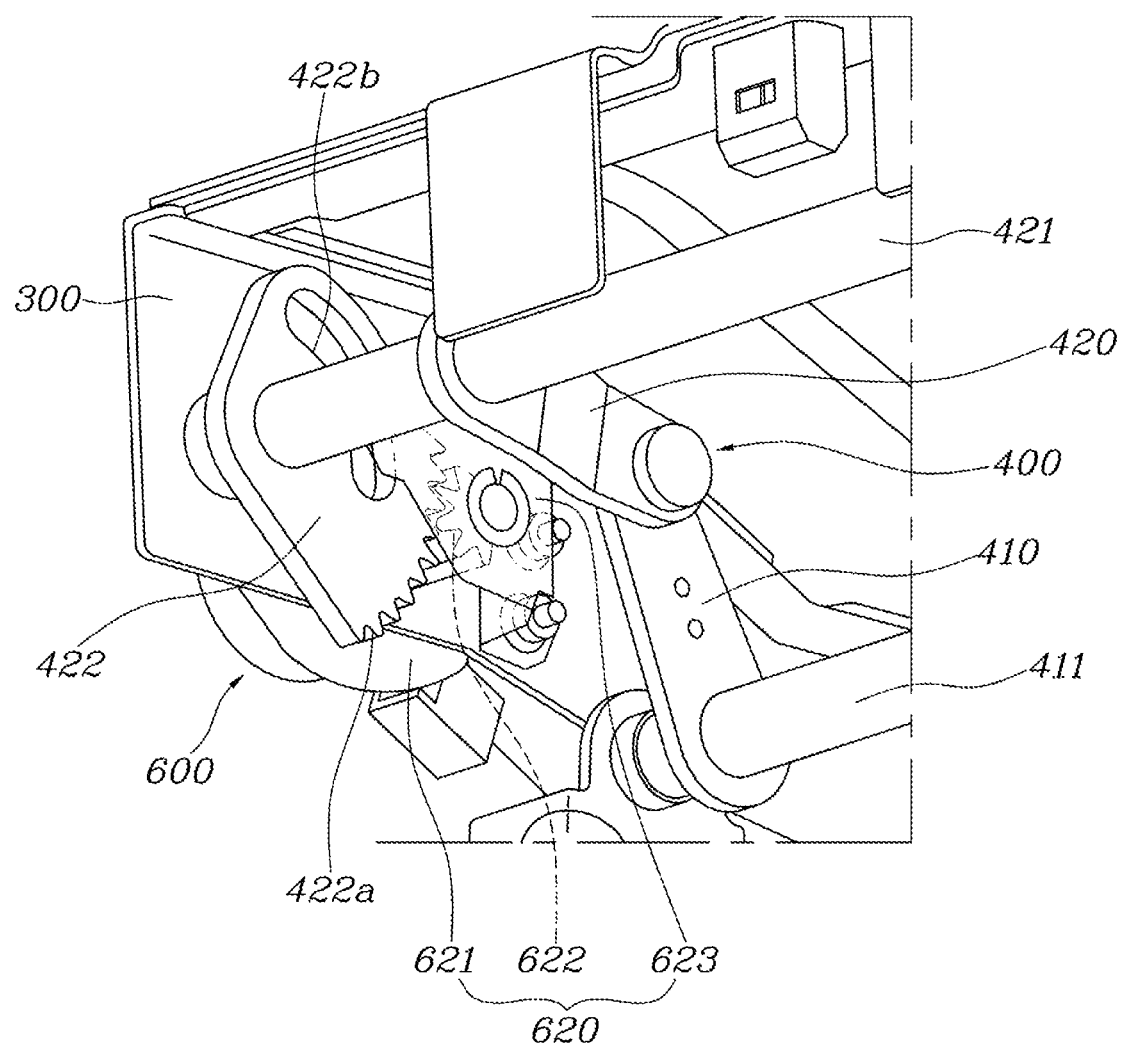
FIG. 3 is a view illustrating connection of a second drive unit of the seat adjustment apparatus for a mobility illustrated in FIG. 1.
Figure 4:
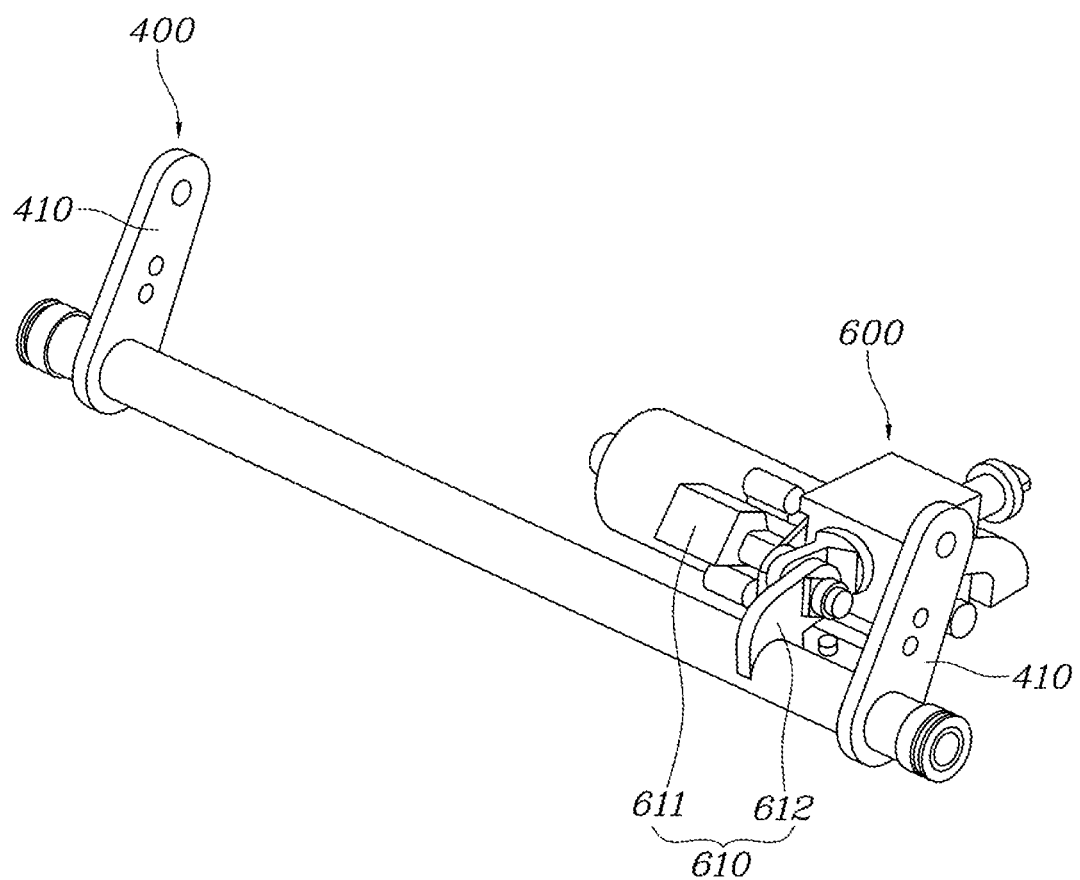
FIG. 4 is a view illustrating a first link and the first drive unit of the seat adjustment apparatus for a mobility illustrated in FIG. 1.
Figure 5:
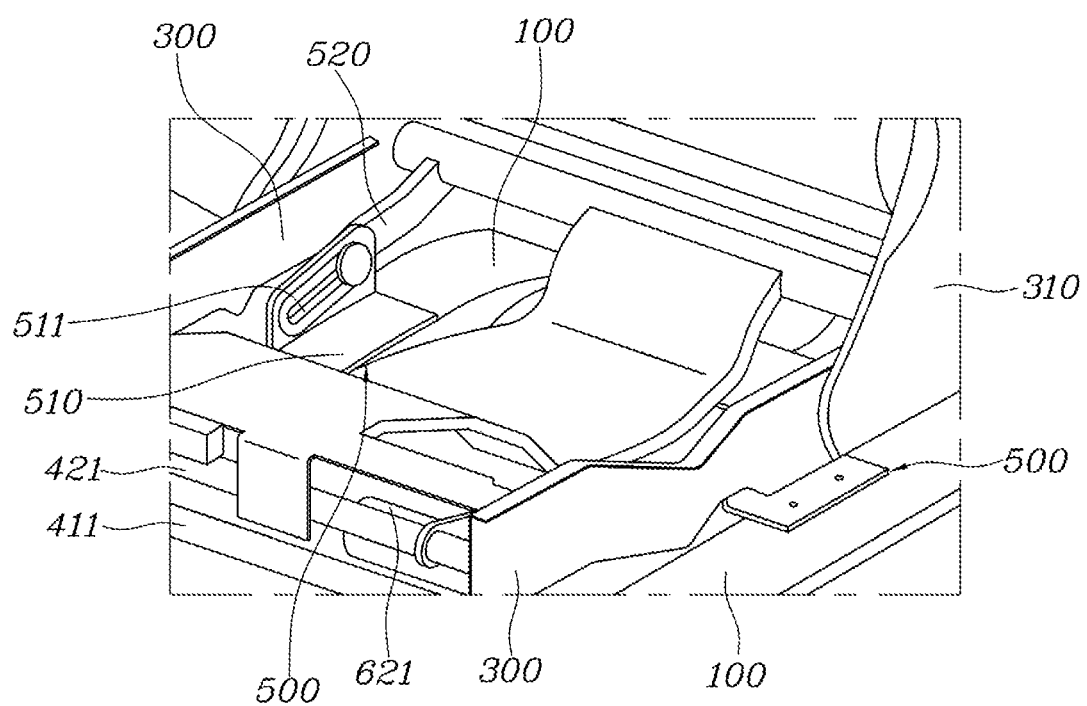
FIG. 5 is a view illustrating a guide unit of the seat adjustment apparatus for a mobility illustrated in FIG. 1.
Figure 6:
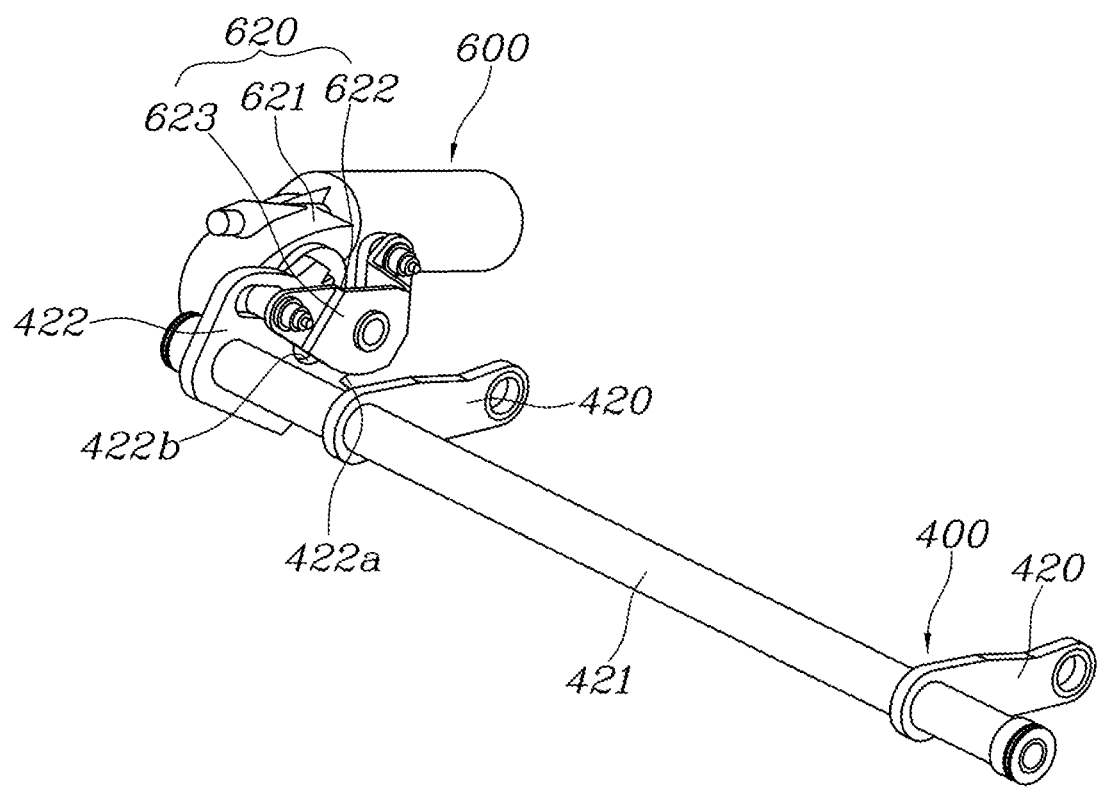
FIG. 6 is a view illustrating a second link and the second drive unit of the seat adjustment apparatus for a mobility illustrated in FIG. 1.

FIG. 1 is a view illustrating a seat adjustment apparatus for a mobility according to the embodiment of the present disclosure, FIG. 2 is a view illustrating connection of a first drive unit of the seat adjustment apparatus for a mobility illustrated in FIG. 1, FIG. 3 is a view illustrating connection of a second drive unit of the seat adjustment apparatus for a mobility illustrated in FIG. 1, FIG. 4 is a view illustrating a first link and the first drive unit of the seat adjustment apparatus for a mobility illustrated in FIG. 1, FIG. 5 is a view illustrating a guide unit of the seat adjustment apparatus for a mobility illustrated in FIG. 1, and FIG. 6 is a view illustrating a second link and the second drive unit of the seat adjustment apparatus for a mobility illustrated in FIG. 1.

Figure 7:
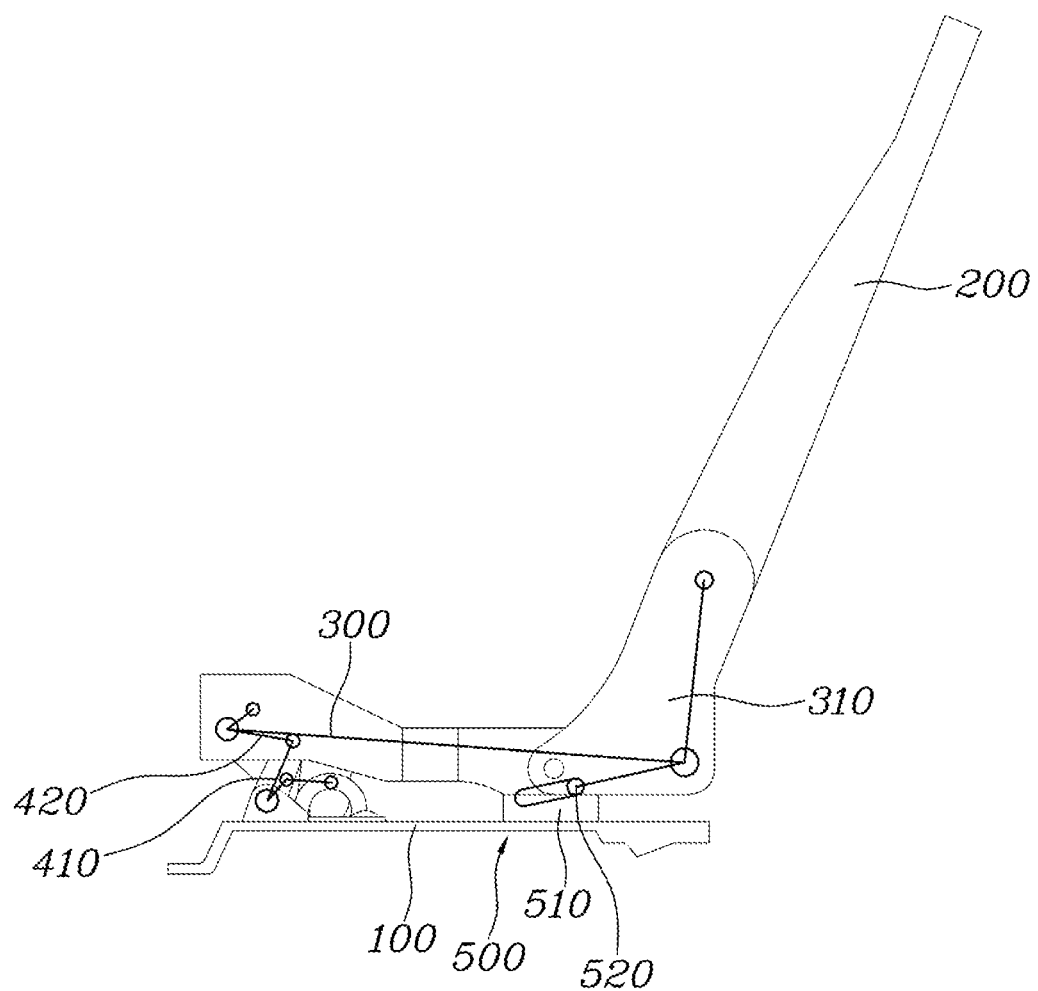
FIG. 7 is a view illustrating a basic mode of the seat adjustment apparatus for a mobility according to the present disclosure.
Figure 8:
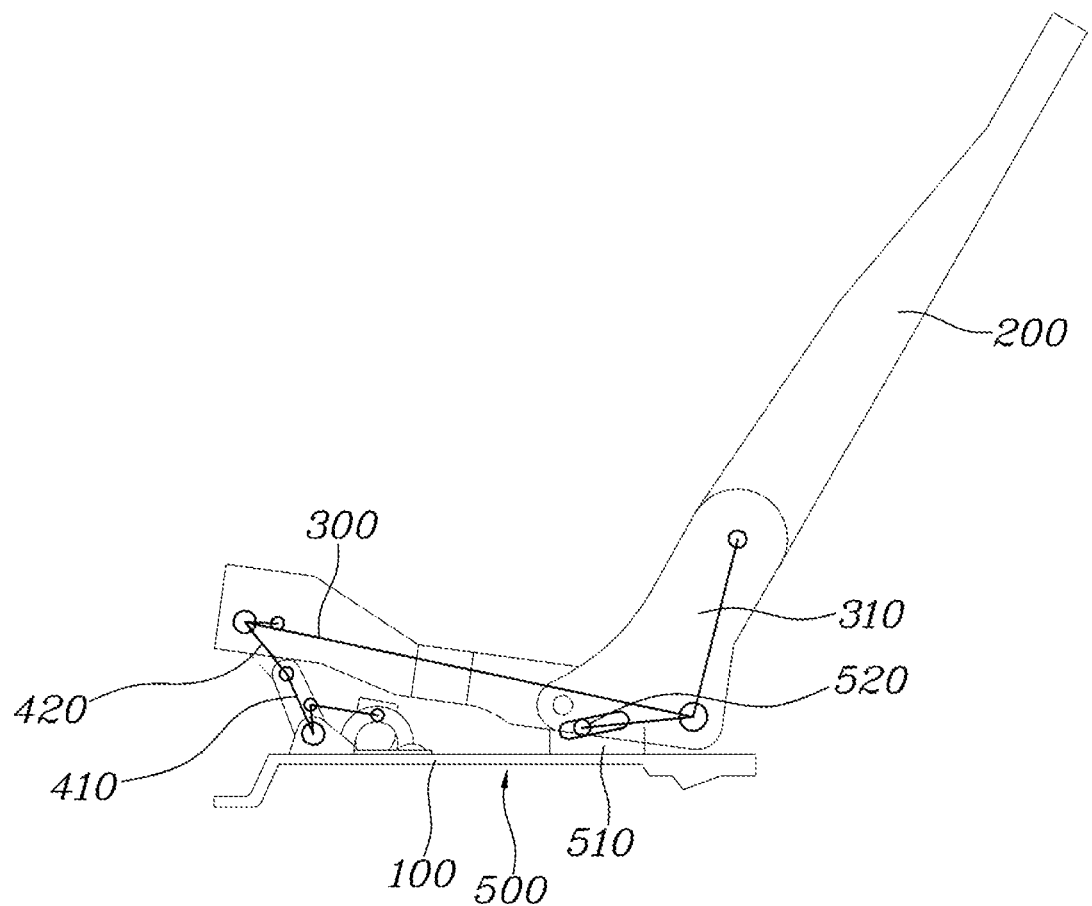
FIG. 8 is a view illustrating a relaxation mode of the seat adjustment apparatus for a mobility according to the present disclosure.
Figure 9:
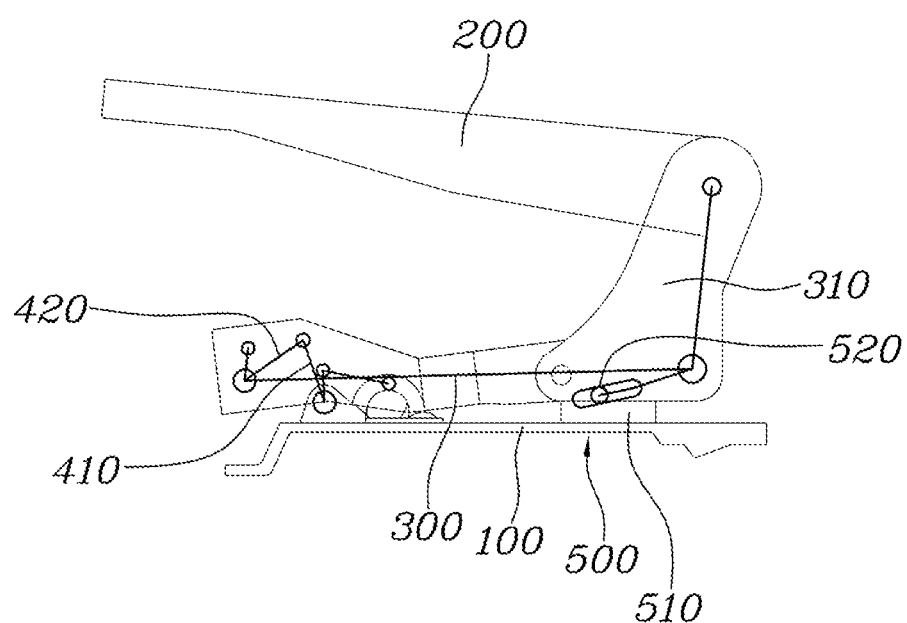
FIG. 9 is a view illustrating a baggage loading mode of the seat adjustment apparatus for a mobility according to the present disclosure.
Figure 10:
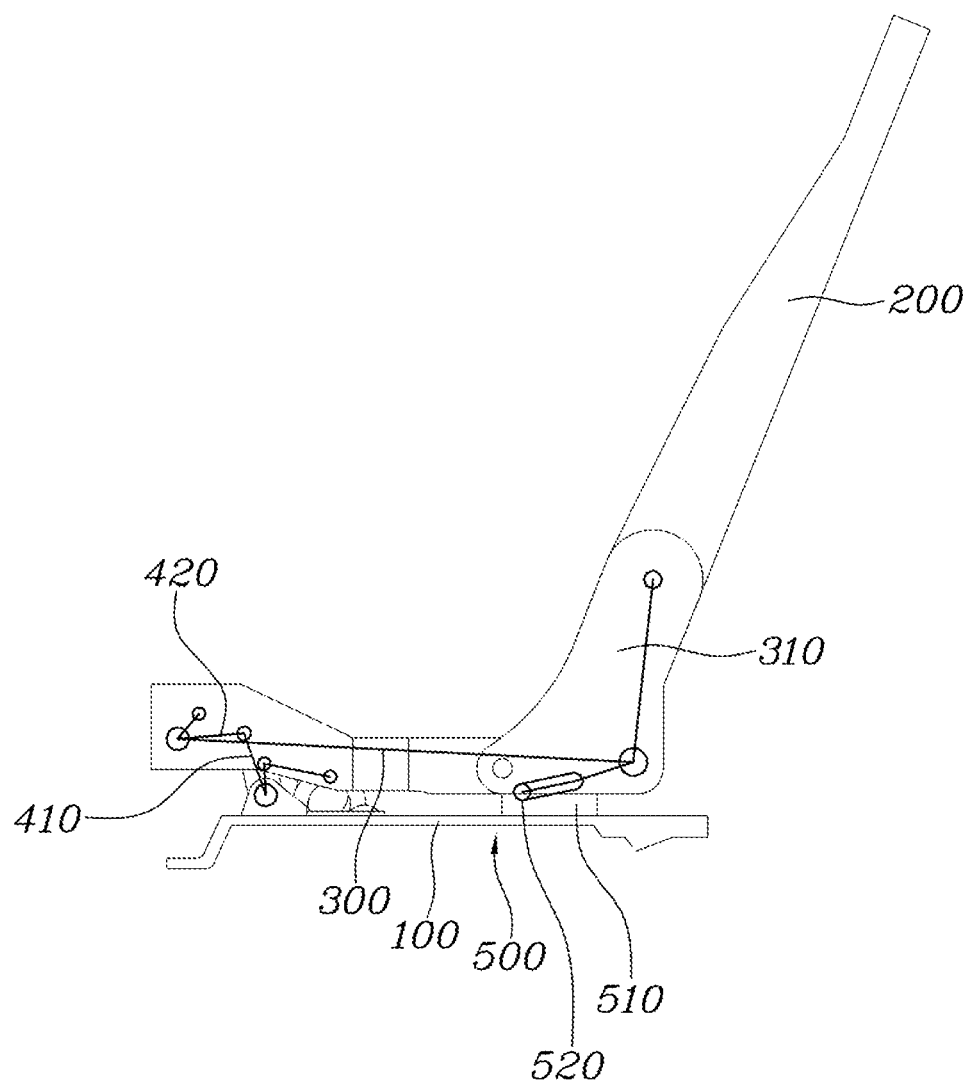
FIG. 10 is a view illustrating a child mode of the seat adjustment apparatus for a mobility according to the present disclosure.

Meanwhile, FIG. 7 is a view illustrating a basic mode of the seat adjustment apparatus for a mobility according to the present disclosure, FIG. 8 is a view illustrating a relaxation mode of the seat adjustment apparatus for a mobility according to the present disclosure, FIG. 9 is a view illustrating a baggage loading mode of the seat adjustment apparatus for a mobility according to the present disclosure, and FIG. 10 is a view illustrating a child mode of the seat adjustment apparatus for a mobility according to the present disclosure.

Figure 11:
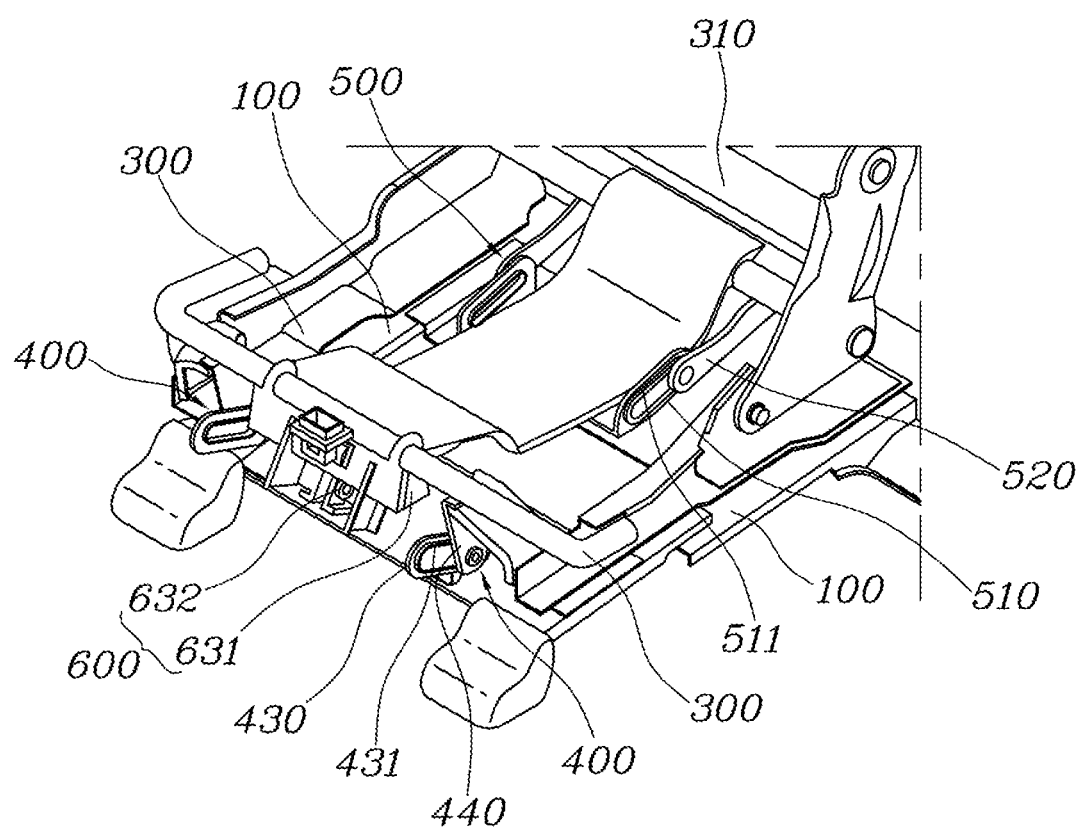
FIG. 11 is a view illustrating a seat adjustment apparatus for a mobility according to another embodiment of the present disclosure.
Figure 12:
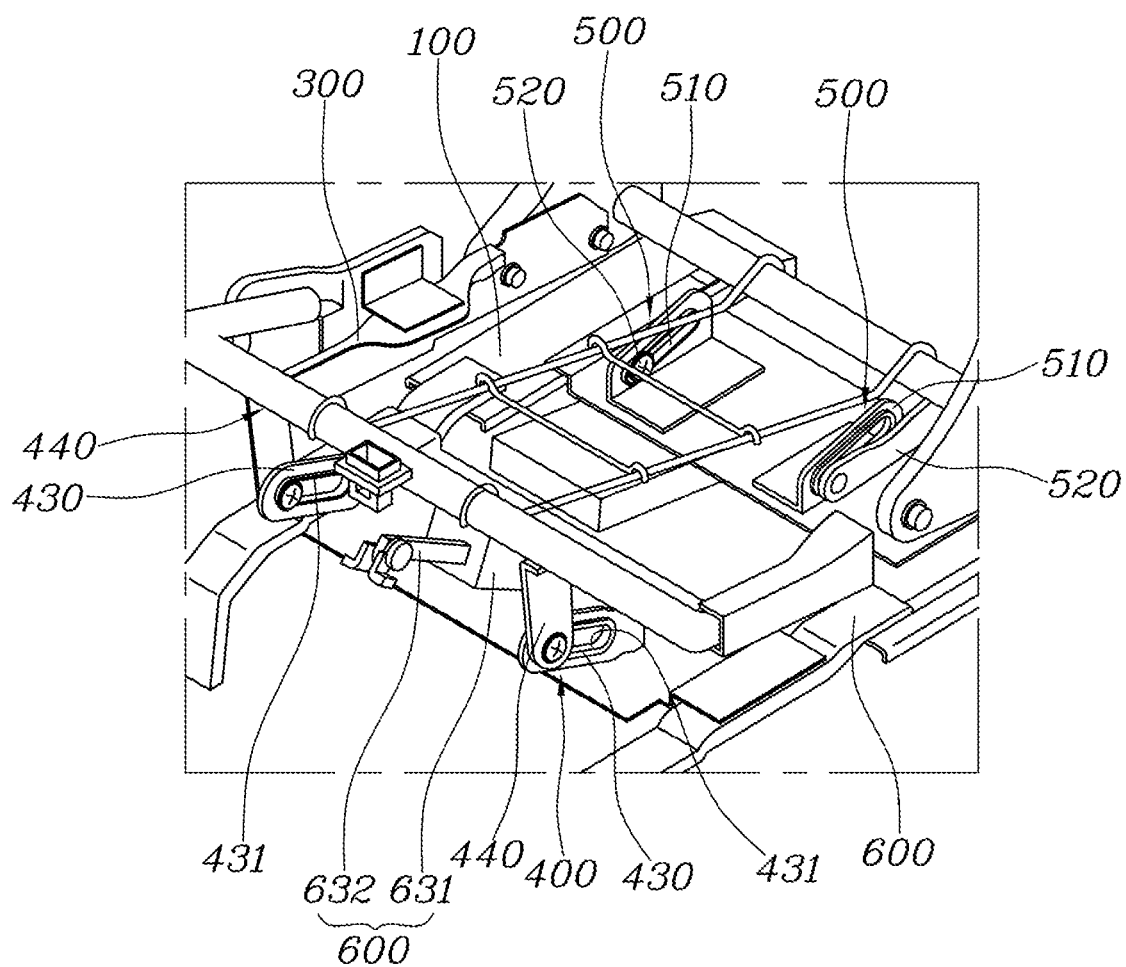
FIG. 12 is a view illustrating an operating state of the seat adjustment apparatus for a mobility according to another embodiment illustrated in FIG. 11.

Meanwhile, FIG. 11 is a view illustrating a seat adjustment apparatus for a mobility according to another embodiment of the present disclosure, and FIG. 12 is a view illustrating an operating state of the seat adjustment apparatus for a mobility according to another embodiment illustrated in FIG. 11.

As illustrated in FIGS. 1 to 6, a seat adjustment apparatus for a mobility according to the present disclosure may include: fixing brackets 100 fixed to a floor surface; setting brackets 300 disposed above the fixing brackets 100 and connected to a back frame 200 so that the back frame 200 is rotatable; a guide unit 400 provided at front ends of the fixing brackets 100 and front ends of the setting brackets 300 and configured to allow the setting brackets 300 to move relative to the fixing brackets 100 while rotating or rectilinearly moving; a guide part 500 provided at rear ends of the fixing brackets 100 and rear ends of the setting brackets 300 and configured to guide the movement of the setting brackets 300 relative to the fixing brackets 100; and a drive unit 600 connected to the guide unit 400 and configured to operate in conjunction with the guide unit 400 and rotate or rectilinearly move so that the setting brackets 300 move or slide upward or downward to change positions thereof.

The present disclosure may allow a seat cushion to slide while changing an angle of the seat cushion in a narrow space such as a rear seat.

The fixing bracket 100 may be movable on the floor surface by including a stationary rail and a movable rail. However, the present disclosure may maximally ensure the amount of change in position of the seat cushion in a situation in which the movement of the seat is restricted, thereby allowing the occupant to be satisfied with the posture.

The fixing bracket 100 according to the embodiment of the present disclosure may be fixed to the floor surface and provided as a pair of fixing brackets 100.

The setting bracket 300 constitutes a seat cushion frame and is disposed above the fixing bracket 100. The setting bracket 300 is provided as a pair of setting brackets 300 corresponding to the pair of fixing brackets 100. The back frame 200 may be rotatably connected to the setting brackets 300. Base brackets 310 may be provided in consideration of an installation position of the back frame 200. The back frame 200 may be rotatably installed on the base brackets 310 by means of a recliner.

The setting bracket 300 may be connected to the fixing bracket 100 by means of the guide unit 400 and the guide part 500.

The guide unit 400 may be provided at the front ends of the fixing brackets 100 and the front ends of the setting brackets 300 and allow the setting brackets 300 to move upward or downward relative to the fixing brackets 100. The guide part 500 is provided at the rear ends of the fixing brackets 100 and the rear ends of the setting brackets 300 and allows the setting brackets 300 to slide in a forward/rearward direction relative to the fixing brackets 100. As described above, the guide unit 400 and the guide part 500 are configured to change the positions of the setting brackets 300, such that the setting brackets 300 perform upward/downward height operations and forward/rearward sliding operations.

In this case, the drive unit 600 may include a first drive unit 610 and a second drive unit 620. The first drive unit 610 is installed on the fixing bracket 100, connected to the guide unit 400, and configured to allow the setting bracket 300 to slide along the guide part 500. The second drive unit 620 is installed on the setting bracket 300, connected to the guide unit 400, and configured to allow the setting bracket 300 to move upward or downward by means of the guide unit 400.

As can be seen in FIG. 2, the first drive unit 610 may be installed on the setting bracket 300 and connected to the guide unit 400. Therefore, the guide unit 400 operates in conjunction with whether the first drive unit 610 operates. The guide unit 400 allows the setting bracket 300 to selectively perform the height operation relative to the fixing bracket 100.

As can be seen in FIG. 3, the second drive unit 620 may be installed on the fixing bracket 100 and connected to the guide unit 400. Therefore, the guide unit 400 operates in conjunction with whether the second drive unit 620 operates. The guide unit 400 allows the setting bracket 300 to selectively slide along the guide part 500.

That is, the operating state of the guide unit 400 may be switched in accordance with the operation of the first drive unit 610 and the operation of the second drive unit 620, such that the position of the seat cushion may be variously adjusted.

Various embodiments of the guide unit 400 may be implemented. The present disclosure will be described below more specifically.

In one embodiment, as can be seen in FIGS. 2 to 5, the guide unit 400 may include a first link 410 rotatably installed on the fixing bracket 100, and a second link 420 rotatably connected to the setting bracket 300 and the first link 410.

That is, the guide unit 400 may include first and second links 410 and 420 rotatably connected to each other. The first link 410 is rotatably installed on the fixing bracket 100, and the second link 420 is rotatably connected to the setting bracket 300. Therefore, when the first link 410 rotates relative to the fixing bracket 100, the setting bracket 300, together with the second link 420, moves in the forward/rearward direction. When the second link 420 rotates relative to the first link 410, the second link 420 is folded or unfolded with respect to the first link 410, such that the setting bracket 300 may move in the upward/downward direction.

In this case, the first drive unit 610 may be connected to the first link 410. When the first drive unit 610 operates, the first link 410 rotates in the forward/rearward direction relative to the fixing bracket 100, such that the setting bracket 300 moves in the forward/rearward direction.

That is, when the first link 410 rotates as the first drive unit 610 operates, the first link 410 may rotate forward or rearward relative to the fixing bracket 100, such that both the second link 420 and the setting bracket 300 connected to the first link 410 move forward or rearward. In this case, because the forward/rearward movements of the setting bracket 300 are guided by the guide part 500, the setting bracket 300 may slide in the forward/rearward direction in accordance with whether the first drive unit 610 operates.

The second drive unit 620 may be connected to the second link 420. When the second drive unit 620 operates, the second link 420 is unfolded or folded with respect to the first link 410, such that the setting bracket 300 moves upward or downward.

That is, when the second link 420 rotates as the second drive unit 620 operates, the second link 420 may rotate relative to the first link 410 and may be folded or unfolded with respect to the first link 410, such that the setting bracket 300 connected to the second link 420 moves upward or downward in the upward/downward direction.

As described above, the sliding operation and the upward and downward movements of the setting bracket 300 may be performed in accordance with the operations of the first and second drive units 610 and 620. The seat cushion may be moved to various positions when any one of the first and second drive units 610 and 620 operates or when both the first and second drive units 610 and 620 operate. Whether to operate the first and second drive units 610 and 620 may be determined under the control of the controller. The controller receives a command made by a user's intention and controls the first and second drive units 610 and 620.

The connection between the guide unit 400 and the first and second drive units 610 and 620 will be described below in detail.

The first link 410 of the guide unit 400 may be provided as a pair of first links 410 connected to each other by a first connection pipe 411. The first drive unit 610 is connected to the first connection pipe 411, and the first link 410, together with the first connection pipe 411, rotates relative to the fixing bracket 100 in accordance with whether the first drive unit 610 operates, such that the setting bracket 300 moves in the forward/rearward direction along the guide part 500.

In this case, the first connection pipe 411 may be provided to connect the pair of fixing brackets 100, and the pair of first links 410 may be coupled to two opposite sides of the first connection pipe 411. In addition, the first connection pipe 411 is rotatably installed on the fixing brackets 100, and the first links 410 are coupled to the first connection pipe 411 and rotate together with the first connection pipe 411.

The first drive unit 610 may be connected to the first connection pipe 411. The first connection pipe 411 rotates in accordance with whether the first drive unit 610 operates. When the first links 410 coupled to the first connection pipe 411 rotates together with the first connection pipe 411, the second links 420 and the setting brackets 300 move in the rotation direction of the first links 410. In particular, an initial position of the first link 410 is positioned in a direction perpendicular to the first connection pipe 411, such that the first link 410 rotates forward or rearward when the first drive unit 610 operates. Therefore, when the first connection pipe 411 rotates as the first drive unit 610 operates, the second link 420 and the setting bracket 300 connected to the first link 410 move forward or rearward.

Specifically, the first drive unit 610 may include a first motor 611, and a connection rod 612 connected to the first connection pipe 411. When the first motor 611 operates, the connection rod 612 is extended or retracted, such that the first link 410, together with the first connection pipe 411, may rotate.

The first motor 611 may be configured as a motor that may rotate forwardly and reversely. The connection rod 612 extending from the first motor 611 is connected to the first connection pipe 411, such that the first connection pipe 411 may rotate as the first connection pipe 411 is extended or retracted. In this case, the connection rod 612 may rectilinearly move when the first motor 611 operates. The first motor 611 and the connection rod 612 may be rotatably connected, or the connection rod 612 and the first connection pipe 411 may be rotatably connected, such that the connection rod 612 smoothly operates.

The first drive unit 610 and the first link 410 of the guide unit 400 may be structured to operate in conjunction with each other. The setting bracket 300 may move in the forward/rearward direction in accordance with whether the first drive unit 610 operates.

In addition, a movement direction of the setting bracket 300 may be guided by the guide part 500 when the setting bracket 300 moves in the forward/rearward direction.

In this case, the guide part 500 may include: a guide bracket 510 fixed to the fixing bracket 100 and having an extension hole 511 extending in the forward/rearward direction; and a slider 520 installed on the setting bracket 300, inserted into the extension hole 511, and configured to move along the extension hole 511.

As illustrated in FIG. 5, the guide part 500 may include the guide bracket 510 and the slider 520. The slider 520 is installed on the setting bracket 300 and moves together with the setting bracket 300. The guide bracket 510 is installed on the fixing bracket 100 and having the extension hole 511 into which the slider 520 is inserted. Therefore, the setting bracket 300 may slide in the forward/rearward direction as the slider 520 moves along the extension hole 511 of the guide bracket 510.

In particular, the extension hole 511 of the guide bracket 510 may extend forward to be inclined downward. Therefore, when the setting bracket 300 slides in the forward/rearward direction, a rear end of the setting bracket 300 may move forward while moving downward along the extension hole 511 of the guide bracket 510 or move rearward while moving upward. As described above, because the extension hole 511 is inclined, the amount of change in angle of the gradient may further increase.

Meanwhile, the second link 420 may be provided as a pair of second links 420 connected to each other by a second connection pipe 421. The second drive unit 620 connected to the second connection pipe 421, and the second link 420, together with the second connection pipe 421, rotates relative to the first link 410 in accordance with whether the second drive unit 620 operates, such that the setting bracket 300 moves upward or downward.

In this case, the second connection pipe 421 may be provided to connect the pair of setting brackets 300, and the second links 420 may be coupled to two opposite sides of the second connection pipe 421. In addition, the second connection pipe 421 is rotatably connected to the setting brackets 300, and the second links 420 are coupled to the second connection pipe 421 and rotate together with the second connection pipe 421.

The second drive unit 620 may be connected to the second connection pipe 421. The second connection pipe 421 rotated in accordance with whether the second drive unit 620 operates. When the second connection pipe 421 rotates, the second link 420 rotates relative to the first link 410 and is unfolded or folded with respect to the first link 410. Therefore, when the second connection pipe 421 rotates as the second drive unit 620 operates, the setting bracket 300 moves upward when the second link 420 is unfolded with respect to the first link 410, and the setting bracket 300 moves downward when the second link 420 is folded with respect to the first link 410.

Specifically, as illustrated in FIGS. 3 and 6, a driven gear part 422 may be provided on the second connection pipe 421. The second drive unit 620 includes a second motor 621 and a driving gear part 622 configured to engage with the driven gear part 422. When the second motor 621 operates, the driven gear part 422 rotates together with the driving gear part 622.

The driven gear part 422 may be coupled to an end of the second connection pipe 421 and rotates together with the second connection pipe 421. The driven gear part 422 engages with the driving gear part 622 of the second drive unit 620, such that the driven gear part 422 rotates in conjunction with whether the second motor 621 operates.

In this case, the second motor 621 may be installed outside the setting bracket 300, and the driving gear part 622 is provided inside the setting bracket 300 and connected to the second motor 621. Therefore, when the driving gear part 622 rotates as the second motor 621 operates, the driven gear part 422 rotates in conjunction with the driving gear part 622, and the second connection pipe 421 rotates together with the driven gear part 422, such that the second link 420 may rotate from the first link 410.

To allow the second drive unit 620 and the driven gear part 422 to operate in conjunction with each other, the driving gear part 622 may rotate when the second motor 621 of the second drive unit 620 operates, and a connection gear 422a may be formed on an outer periphery of the driven gear part 422 and engages with the driving gear part 622. The driven gear part 422 may be configured as a sector gear having a fan shape. The connection gear 422a is formed on the outer periphery of the driven gear part 422 and engages with the driving gear part 622.

In addition, a guide hole 422b may be formed at an end of the driven gear part 422 and extend in a rotation direction. A support part 623 may be provided on the second drive unit 620, and the support part 623 supports the rotation of the driving gear part 622. The support part 623 is inserted into the guide hole 422b and guides the rotation of the driven gear part 422.

As can be seen in FIG. 6, the second drive unit 620 may have the support part 623 coupled to the second motor 621. The support part 623 is formed to be curved to surround an outer portion of the driving gear part 622, and the driving gear part 622 may be rotatably coupled to the support part 623. Therefore, the driving gear part 622 is rotatably connected to the second motor 621 and the support part 623, such that the operation of the driving gear part 622 is stabilized.

In addition, the support part 623 may penetrate the guide hole 422b formed in the driven gear part 422, and the support part 623 may be coupled to the setting bracket 300 or the second motor 621, such that the support part 623 guides the rotation of the driven gear part 422. That is, the guide hole 422b of the driven gear part 422 extends in the rotation direction of the driven gear part 422, and the support part 623 is inserted into the guide hole 422b. Therefore, when the second motor 621 operates, the driving gear part 622 rotates the driven gear part 422, and the rotation direction of the driven gear part 422 is guided by the support part 623 inserted into the guide hole 422b, such that the second connection pipe 421, together with the driven gear part 422, may rotate in a predetermined direction.

The seat adjustment apparatus for a mobility according to the embodiment of the present disclosure may implement various modes.

That is, as illustrated in FIG. 7, in a basic mode, the first and second links 410 and 420 of the guide unit 400 may define an initial basic angle, and the slider 520 of the guide part 500 may be positioned at a rear end of the extension hole 511 of the guide bracket 510.

As illustrated in FIG. 8, in a relaxation mode, the first and second drive units 610 and 620 may operate. In the relaxation mode, the seat is entirely tilted, and the occupant's lower body is lifted up.

That is, when the first link 410 rotates forward as the first motor 611 operates, the second motor 621 may operate, and the second link 420 may be unfolded with respect to the first link 410. Therefore, the guide part 500 operates in conjunction with the guide unit 400, and the slider 520 moves forward from the rear end of the extension hole 511 of the guide bracket 510.

Therefore, the position of the setting bracket 300 may be changed so that the front end of the setting bracket 300 moves upward, the rear end of the setting bracket 300 moves downward, and the setting bracket 300 entirely moves forward. Therefore, the mode of the seat cushion may be changed to the relaxation mode.

As illustrated in FIG. 9, in a baggage loading mode, the first and second drive units 610 and 620 may operate, and the back frame 200 is folded. In the baggage loading mode, the seat is entirely lowered, and the back frame 200 is folded, such that the baggage may be loaded onto the back frame 200.

That is, when the first link 410 rotates forward as the first motor 611 operates, the second motor 621 may operate, and the second link 420 is folded with respect to the first link 410. In this case, the second motor 621 may be maintained at the initial position without operating. In addition, the guide part 500 operates in conjunction with the guide unit 400, the slider 520 moves forward from the rear end of the extension hole 511 of the guide bracket 510, and the back frame 200 is folded.

Therefore, the position of the setting bracket 300 is changed so that the front and rear ends of the setting bracket 300 move downward, and the setting bracket 300 entirely moves forward. Therefore, the mode may be changed to the baggage loading mode in which the baggage may be loaded onto the back frame 200.

As illustrated in FIG. 10, in a child mode, the first and second drive units 610 and 620 may operate. In the child mode, the position of the seat cushion is lowered, and an occupant having a small body type is easily seated.

That is, when the first link 410 rotates forward as the first motor 611 operates, the second motor 621 may operate, and the second link 420 is unfolded. In this case, the second motor 621 may be maintained at the initial position without operating. Therefore, the guide part 500 operates in conjunction with the guide unit 400, and the slider 520 moves forward from the rear end of the extension hole 511 of the guide bracket 510.

Therefore, the position of the setting bracket 300 may be changed so that the rear end of the setting bracket 300 moves downward, and the setting bracket 300 entirely moves forward. Therefore, the mode may be changed to the child mode in which the occupant having a small body type is easily seated.

As described above, the present disclosure may variously change the position and shape of the seat by controlling the operations of the first and second drive units 610 and 620.

Meanwhile, as illustrated in FIGS. 11 to 12, another embodiment of the guide unit 400 may be applied.

The guide unit 400 according to another embodiment may include: a height bracket 430 fixed to the fixing bracket 100 and having a slit hole 431 extending to be inclined in the forward/rearward direction; and a movable bracket 440 installed on the setting bracket 300, extending downward, inserted into the slit hole 431, and configured to move along the slit hole 431.

That is, the guide unit 400 may include the movable bracket 440 configured to move relative to the height bracket 430. When the movable bracket 440 moves along the slit hole 431 of the height bracket 430, the position of the setting bracket 300 may be changed.

Specifically, the drive unit 600 may include: a drive motor 631 installed on the fixing bracket 100; and a driving rod 632 extending from the drive motor 631, connected to the setting bracket 300, and configured to be retracted or extended when the drive motor 631 operates.

In addition, the slit hole 431 of the guide unit 400 may extend forward to be inclined upward, the driving rod 632 of the drive unit 600 may operate to be retracted or extended in a direction in which the slit hole 431 is inclined.

Meanwhile, the guide part 500 may include the guide bracket 510 fixed to the fixing bracket 100 and having the extension hole 511 extending forward to be inclined downward, and the slider 520 installed on the setting bracket 300, inserted into the extension hole 511, and configured to move along the extension hole 511.

As described above, when the driving rod 632 is retracted or extended straight by the drive motor 631, the movable bracket 440, together with the setting bracket 300 connected to the driving rod 632, may move along the slit hole 431 of the height bracket 430. At the same time, the slider 520, together with the setting bracket 300, moves along the extension hole 511 of the guide bracket 510.

Therefore, the front end of the setting bracket 300 may move forward while moving upward along the slit hole 431 of the guide unit 400, and the rear end of the setting bracket 300 may move forward while moving downward along the extension hole 511 of the guide part 500. On the contrary, when the drive motor 631 operates in the reverse direction, the front end of the setting bracket 300 may move rearward while moving downward along the slit hole 431 of the guide unit 400, the rear end of the setting bracket 300 may move rearward while moving upward along the extension hole 511 of the guide part 500.

Therefore, even though the change in posture of the seat is restricted because of a narrow indoor space, the upward and downward movements and the sliding operation for the seat cushion may be implemented, and the position of the seat may be changed to conform to various postures desired by the occupant.

According to the seat adjustment apparatus for a mobility having the above-mentioned structure, the seat cushion slides in the forward/rearward direction while moving upward or downward when the seat cushion is tilted, thereby improving seating convenience by allowing the occupant to take a stable posture.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A seat adjustment apparatus for a mobility, the seat adjustment apparatus comprising:
a fixing bracket configured to be fixed to a floor surface;
a setting bracket disposed above the fixing bracket and connected to a back frame so that the back frame is rotatable;
a guide unit disposed at a front end of the fixing bracket and a front end of the setting bracket and configured to allow the setting bracket to move relative to the fixing bracket;
a guide part disposed at a rear end of the fixing bracket and a rear end of the setting bracket and configured to guide a movement of the setting bracket relative to the fixing bracket; and
a drive unit connected to the guide unit and configured to operate in conjunction with the guide unit to allow the guide unit to rotate or rectilinearly move relative to the fixing bracket so that the setting bracket moves or slides to change a position thereof.

2. The seat adjustment apparatus of claim 1, wherein the drive unit comprises a first drive unit and a second drive unit,
wherein the first drive unit is installed on the fixing bracket, connected to the guide unit, and configured to allow the setting bracket to slide along the guide part, and
wherein the second drive unit is installed on the setting bracket, connected to the guide unit, and configured to allow the setting bracket to move upward or downward by means of the guide unit.

3. The seat adjustment apparatus of claim 2, wherein the guide unit comprises:
a first link rotatably installed on the fixing bracket; and
a second link rotatably connected to the setting bracket and the first link.

4. The seat adjustment apparatus of claim 3, wherein the first drive unit is connected to the first link,
wherein when the first drive unit operates, the first link rotates in a forward/rearward direction relative to the fixing bracket, such that the setting bracket moves in the forward/rearward direction,
wherein the second drive unit is connected to the second link, and
wherein when the second drive unit operates, the second link is unfolded or folded with respect to the first link, such that the setting bracket moves upward or downward.

5. The seat adjustment apparatus of claim 3, wherein the first link is provided as a pair of first links connected to each other by a first connection pipe, and
wherein the first drive unit is connected to the first connection pipe, and the first link, together with the first connection pipe, rotates relative to the fixing bracket in accordance with whether the first drive unit operates, such that the setting bracket moves in a forward/rearward direction along the guide part.

6. The seat adjustment apparatus of claim 5, wherein the first drive unit comprises:
a first motor; and
a connection rod connected to the first connection pipe, and
wherein when the first motor operates, the connection rod is extended or retracted, such that the first link rotates together with the first connection pipe.

7. The seat adjustment apparatus of claim 3, wherein a second link is provided as a pair of second links connected to each other by a second connection pipe, and
wherein the second drive unit is connected to the second connection pipe, and the second link, together with the second connection pipe, rotates relative to the first link in accordance with whether the second drive unit operates, such that the setting bracket moves upward or downward.

8. The seat adjustment apparatus of claim 7, wherein a driven gear part is provided on the second connection pipe, wherein the second drive unit comprises:
a second motor; and
a driving gear part configured to engage with the driven gear part, and
wherein when the second motor operates, the driven gear part rotates together with the driving gear part.

9. The seat adjustment apparatus of claim 8, wherein the driving gear part rotates when the second motor of the second drive unit operates, and wherein a connection gear is formed on an outer periphery of the driven gear part and engages with the driving gear part.

10. The seat adjustment apparatus of claim 8, wherein a guide hole is formed at an end of the driven gear part and extends in a rotation direction, and
wherein a support part is provided on the second drive unit and supports a rotation of the driving gear part, and the support part is inserted into the guide hole and guides a rotation of the driven gear part.

11. The seat adjustment apparatus of claim 2, wherein in a relaxation mode, the first and second drive units operate such that the back frame is fully tilted back when the setting bracket is moved entirely forward.

12. The seat adjustment apparatus of claim 2, wherein in a baggage loading mode, the first and second drive units operate such that the back frame is rotated relative to the setting bracket so as to be fully folded front.

13. The seat adjustment apparatus of claim 2, wherein in a child mode, the first and second drive units operate such that a position of a seat cushion is lowered when the setting bracket is moved downward.

14. The seat adjustment apparatus of claim 1, wherein the guide part comprises:
a guide bracket fixed to the fixing bracket and having an extension hole extending in a forward/rearward direction; and
a slider installed on the setting bracket, inserted into the extension hole, and configured to move along the extension hole.

15. The seat adjustment apparatus of claim 14, wherein the extension hole of the guide bracket extends forward to be inclined downward.

16. The seat adjustment apparatus of claim 1, wherein the guide unit comprises:
a height bracket fixed to the fixing bracket and having a slit hole extending to be inclined in a forward/rearward direction; and
a movable bracket installed on the setting bracket, extending downward, inserted into the slit hole, and configured to move along the slit hole.

17. The seat adjustment apparatus of claim 16, wherein the drive unit comprises:
a drive motor installed on the fixing bracket; and
a driving rod extending from the drive motor, connected to the setting bracket, and configured to be retracted or extended when the drive motor operates.

18. The seat adjustment apparatus of claim 16, wherein the slit hole of the guide unit extends forward to be inclined upward, and the driving rod of the drive unit operates to be retracted or extended in a direction in which the slit hole is inclined.

19. The seat adjustment apparatus of claim 16, wherein the guide part comprises:
a guide bracket fixed to the fixing bracket and having an extension hole extending forward to be inclined downward; and
a slider installed on the setting bracket, inserted into the extension hole, and configured to move along the extension hole.

20. A car comprising the seat adjustment apparatus of claim 1.

* * * * *